United States Patent [19]
Drlik

[11] Patent Number: 4,904,077
[45] Date of Patent: Feb. 27, 1990

[54] EYEGLASS FRAME WITH LOCKED SCREW JOINT

[75] Inventor: Günther Drlik, Pforzheim, Fed. Rep. of Germany

[73] Assignee: OBE-Werk Ohnmacht & Baumgartner GmbH & Co. KG, Ispringen, Fed. Rep. of Germany

[21] Appl. No.: 262,987

[22] Filed: Oct. 26, 1988

[30] Foreign Application Priority Data

Nov. 2, 1987 [DE] Fed. Rep. of Germany ....... 3737126

[51] Int. Cl.$^4$ ............................ G02C 5/12; G02C 5/22
[52] U.S. Cl. .................................. 351/141; 351/153; 16/228
[58] Field of Search .................. 351/153, 141, 147; 16/228

[56] References Cited

U.S. PATENT DOCUMENTS 4,339,179 7/1982 Dany ................................ 351/153
4,776,685 10/1988 Jeunet ............................... 351/141

Primary Examiner—P. M. Dzierzynski
Attorney, Agent, or Firm—Balogh, Osann, Kramer, Dvorak, Genova & Traub

[57] ABSTRACT

This invention relates to a locked screw joint for connecting two eyeglass members, particularly members of a closing block or a hinge of an eyeglass frame. A bore is provided with screw threads at one end and is provided at its other end with an abutment for the head of a hinge screw, which abutment consists of a flat surface or of a counterbore. The locked screw joint can be opened and reconnected, as is required in the manufacture and use of eyeglass frames. This is accomplished in that a conical elevation surrounding the bore is provided on the abutment surface for the screw head, the inner edge of the shank of the screw has a conical constriction under the screw head and as the shank is screwed in the conical elevation is deformed to extend into and is locked in the constriction.

19 Claims, 4 Drawing Sheets

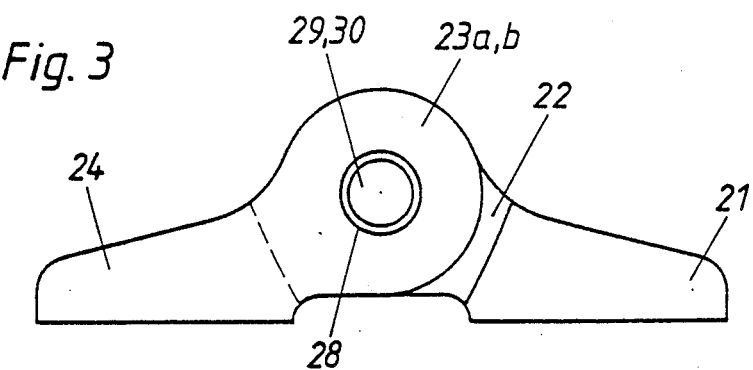
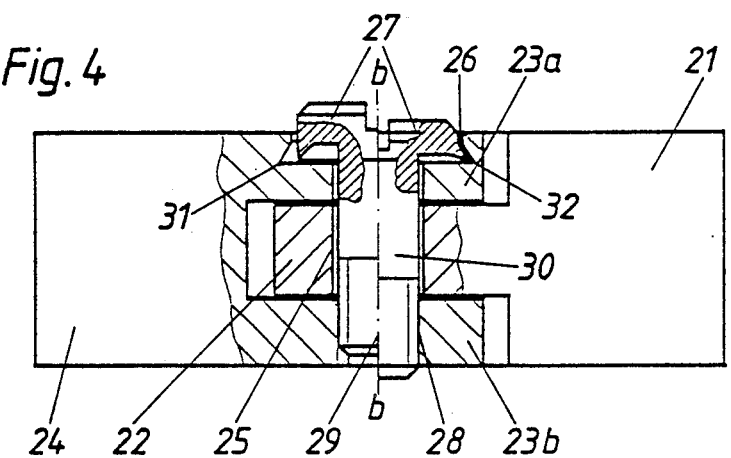

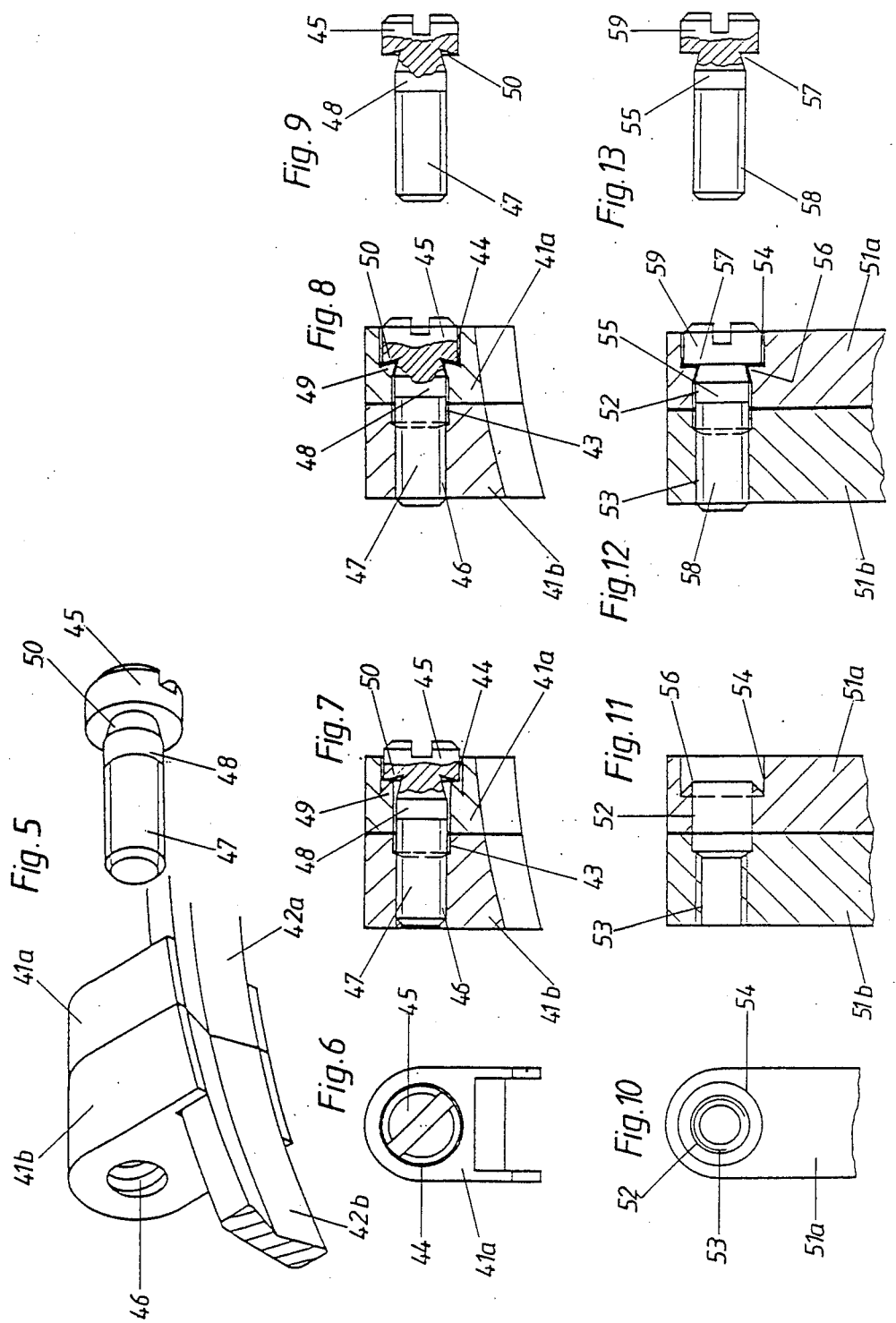

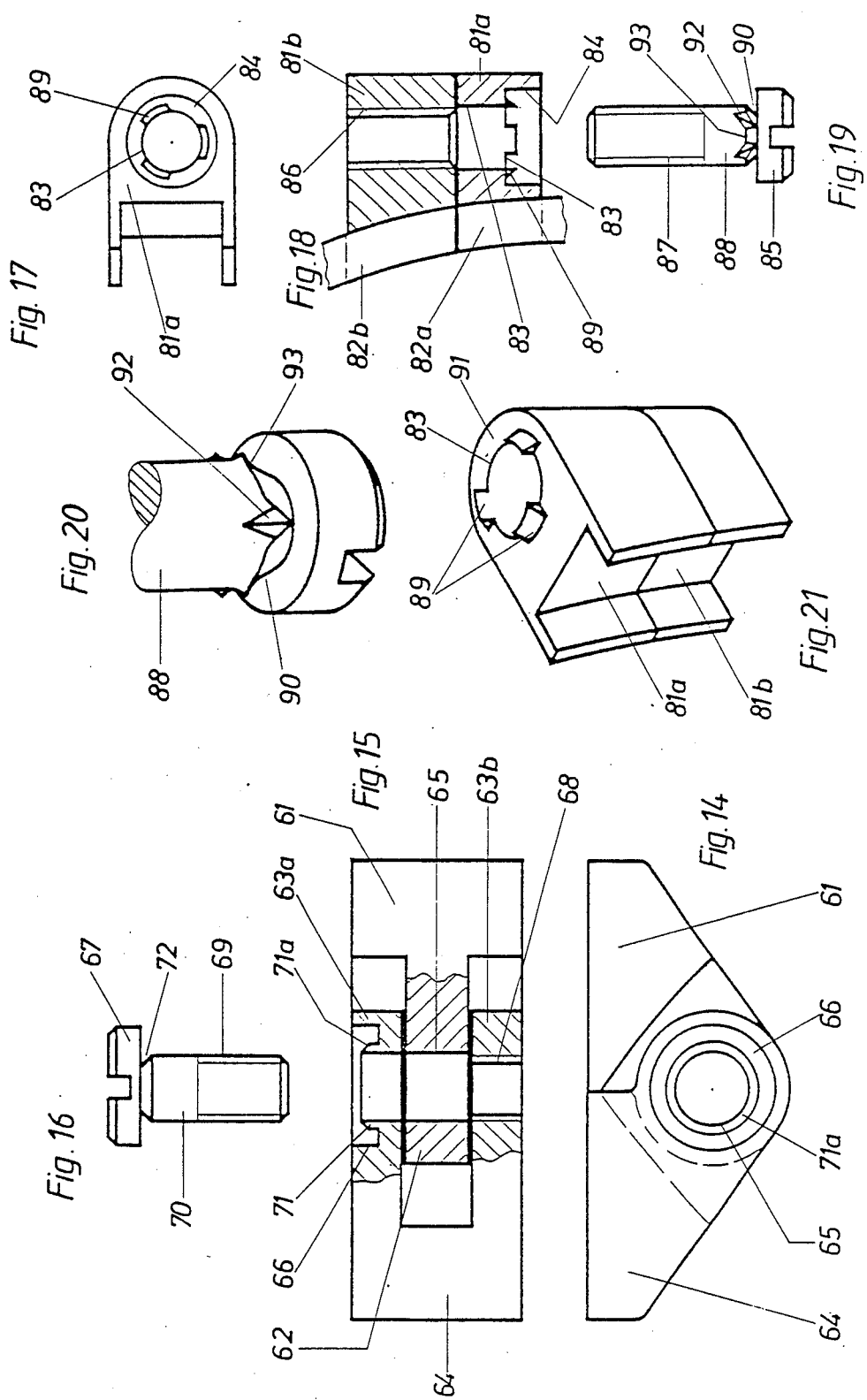

EYEGLASS FRAME WITH LOCKED SCREW JOINT

This invention relates to an eyeglass frame provided with a screw joint which is locked against separation and connects frame members, which particularly consist of closing block or hinge members, wherein a bore is provided at one end with female screw threads and at its other end with a flat abutment surface, particularly in a receptacle, for a screw head.

DESCRIPTION OF THE PRIOR ART

Such releasable screw-locking means are known in metal and plastic eyeglasses, e.g., in the form of plastic varnish or lacquer which is applicable to the screw threads of the shank (Tuflock) or of a plastic extrusion which is adapted to be inserted into a longitudinal groove formed in the screw threads of the shank (Longlock). These two forms of screw-locking means require additional operations and render the making and the separation of the screw joint more difficult and may no longer be effective after a single release.

Other screw-locking means for such purposes are also known in the art, i.e., from French patent specification No. 25 91 762 for closing blocks, from German Utility Model 77 34 154 for eyeglass hinges and others. In that case the locking action is non-positive rather than positive. In accordance with German Utility Model 19 46 895 a positive joint is subsequently provided by an additional operation. Besides, all proposals involve a relatively high expenditure.

It is an object of the invention to provide positive locking means which can repeatedly be released and screwably reconnected for use with screw joints which can be separated and made, e.g., in eyeglass frames, for use during the manufacture and the use.

For instance, the closing block must be closed to a larger extent for the final machining of eyeglass frames, for instance, for a treatment in a tumbling barrel, with succeeding electrodeposition and the like, and must then be reopened for the insertion or subsequent replacement of the lenses. This is also applicable to the final machining of eyeglass hinges of metal and plastic eyeglasses, which hinges must subsequently be adjusted in use by the optician to provide the correct sliding friction so that the bows when they have been opened will not fall down and the like because the sliding friction is too low.

In accordance with the invention that object is accomplished in an eyeglass frame in accordance with the prior art part of claim 1 in that a conical elevation surrounding the bore is provided on the abutment surface for the screw head, the inner edge of the shank of the screw has a conical constriction under the screw head and as the shank is screwed in the conical elevation is deformed to extend into and is locked in the constriction. This provides for the person skilled in the eyeglass art a surprisingly simple solution of the problem how the screw can be positively locked in a joint which can be separated.

In accordance with a further concept of the invention the object can be accomplished in an eyeglass frame in accordance with the prior art part of claim 2 in that a conical recess is provided on the outer periphery of the abutment surface for the screw head and the shank is provided at its outer edge under the screw head with a conical rib, which will be deformed and extend into the recess so as to effect a lock as the shank is screwed in. As has been mentioned hereinbefore this will also provide a surprisingly simple solution to the problem which is faced here. The conical elevation or recess in the receptacle for the screw head will constitute an acute-angled annular rib or recess having an included angle between 35 and 45 degrees and will extend around the rim of the bore or receptacle.

Further details of the eyeglass frame provided with means for locking screw joints of frame members in accordance with the invention will become apparent from the following description of preferred illustrative embodiments in conjunction with the drawing, in which FIGS. 1 and 2 are, respectively, a side elevation and top plan view showing partly in section a first embodiment of an eyeglass hinge.

FIGS. 3 and 4 are, respectively, a side elevation and a top plan view showing partly in section a second embodiment of an eyeglass hinge.

FIG. 5 is a perspective view showing a closing block for use in metal eyeglasses.

FIGS. 6 to 9 are a top plan view and sectional views showing that closing block together with a screw.

FIGS. 10 to 13 are a top plan view and sectional views showing such screw-locking means together with a screw.

FIGS. 14 to 16 are a side elevation and a top plan view showing partly in section another embodiment of an eyeglass hinge and a screw.

FIGS. 17 to 19 are a side elevation and a top plan view showing partly in section a further embodiment of a joint for closing block, and a screw.

FIG. 20 is a perspective view showing the screw of FIG. 19, and

FIG. 21 is a perspective view showing a closing block which has been turned through 180°.

Figure 1:
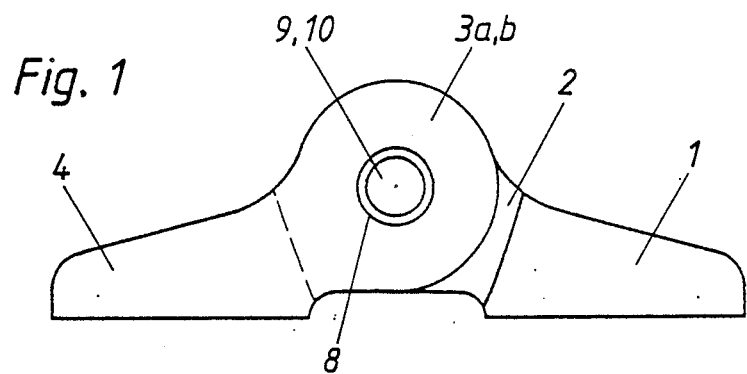
Figure 2:
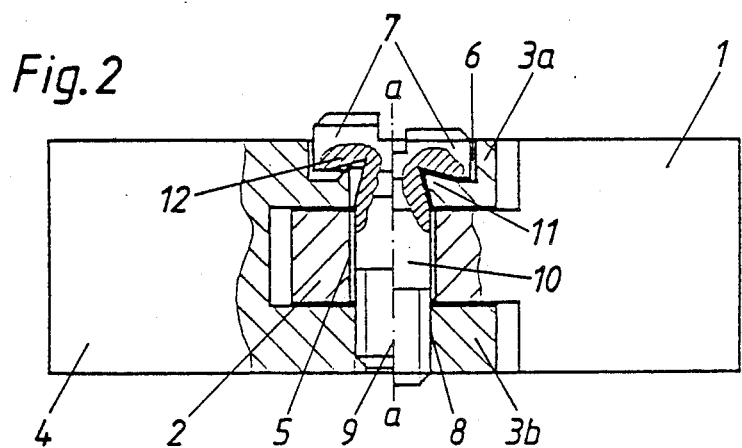

In the first embodiment shown in FIGS. 1 and 2 of an eyeglass hinge in accordance with the invention for use in metal and plastic eyeglasses the center part hinge member 1 is shown to have a hinge eye 2, which extends between the two hinge eyes 3a and 3b of the bow hinge member 4. The hinge bore 5 is formed at 3a with a counterbore 6 for the screw head 7 and is provided at 3b with screw threads 8 for cooperation with the screw-threaded portion 9 of the shank 10.

In this embodiment the counterbore 6 is provided along the rim of the bore 5 with an inwardly tapered, conical collar 11, and it is apparent from the drawing that the collar 11 self-lockingly cooperates with a mating shoulder 12, which defines a machined recess between the shank 10 and the head 7 of the screw, as the shank is screwed in. One half of the screw is shown in position during the screw-in movement on the left of the line a—a and that half is shown in position after the screw-in movement on the right of that line.

In this case the shank 10 and the head 7 of the screw are made of special steel and the hinge members consist of nickel silver. During the screw-in movement the acute-angled collar 11 is forced into the recess-defining shoulder 12 to effect a lock. That joint can be separated with the hinge is to be opened and serves to re-lock when the hinge screw 7, 9, 10 is screwed in again.

In the second embodiment shown in FIGS. 3 and 4 of an eyeglass hinge in accordance with the invention the center part hinge member 21 is provided with a hinge eye 22, which also extends between the two hinge eyes 23a and 23b of the bow hinge member 24. The hinge bore 25 is provided here at 23a with a counterbore 26 for the screw head 27 and at 23b with screw threads 28 for cooperation with the screw-threaded portion 29 of the shank 30 of the screw.

In this case the counterbore 26 has an undercut 31, which during the screw-in movement cooperates with an outwardly tapering, conical machined rib 32 on the lower rim of the screw head 27. This is apparent from the drawing. One half of the screw is shown in position during the screw-in movement on the left of the line b—b and after the screw-in movement on the right of said line.

As a result, the screw-in movement causes the acute-angled rib 32 at the lower rim of the screw head 27 to enter the undercut 31 so as to effect a lock. That joint can be separated when it is desired to open the hinge and can be relocked when the hinge screw 27, 29, 30 is screwed in again.

FIGS. 5 to 9 show a further embodiment for use with a closing block for metal rim eyeglasses. The two parts 41a, 41b of the closing block are soldered to respective ends 42a and 42b of the rim for holding the lenses so that the rims can be opened and closed when the eyeglasses are to be and have been inserted. One closing block part 41a is provided at a bore 43 with a counterbore 44 for receiving the screw head 45. The second part 41b of the closing block is provided with screw threads 46 for cooperation with the screw-threaded portion 47 of the shank 48 of the screw.

In this case the counterbore 44 is provided along its rim 43 with an inwardly tapering, conical collar 49 and during the screw-in movement self-lockingly cooperates with a mating shoulder 50 defining a recess between the shank 48 and the head 45 of the screw, as is apparent from the drawing.

Another embodiment of screw-locking means is shown in FIGS. 10 to 13. A two-part block 51a, 51b has a bore 52 provided at one end with screw threads 53 and with a machined recess 54 at the other end and receiving a screw 55. The lock is effected by a conical collar 56 at the bottom of the recess 54 and the hole 52 of the bore. During the screw-in movement that collar 56 is releasably forced into the screw 55 having an undercut 57 between the screw threads 58 and the screw head 59.

The principle in accordance with the invention may also be used for a combination of a hinge block and closing block, i.e., in so-called closing block jaws.

An additional embodiment of screw-locking means is shown in FIGS. 14 to 16 for an eyeglass hinge according to a further concept of the invention. The center part hinge member 61 is provided with a hinge eye 62, which extends between the two hinge eyes 63a and 63b of the bow hinge member 64. The hinge bore 65 has at 63a a counterbore 66 for receiving the screw head 67 and at 63b has screw threads 68 for cooperation with the screw-threaded portion 69 of the shank 70 of the screw.

Along the rim of the bore 65 the counterbore 66 is provided with a collar 71, which consists of a cylindrical portion having conical crest and which during the screw-in movement self-lockingly cooperates with a mating shoulder 72, which defines a machined portion between the shank 70 and the head 67 of the screw, as is apparent from the drawing showing the preceding embodiments.

In that case too the shank 70 and the head 67 of the screw are suitably made of special steel and the hinge members are made of nickel silver. As a result, the screw-in movement causes the conical crest 71a and the adjoining cylindrical portion to be forced into the recess-defining shoulder 72 and in a reverse movement the crest 71a is raised at the head 67 as the screw is opened.

Because the cylindrical portion of the collar 71 has a smaller wall thickness, the inserting and extracting movements can be performed more easily than in the first embodiment shown in FIGS. 1 and 2, where an acute collar 11 is provided as a continuous annular cone, i.e., the turning-in pressure is reduced.

As a last embodiment a closing block is shown in FIGS. 17 to 21. In that case the two parts 81a and 81b of the closing block are soldered to the corresponding ends 82a and 82b of the lens-holding rim and are opened and subsequently closed when the lenses are to be and have been inserted. One part 81a of the closing block is provided at the bore 83 with a counterbore 84 for receiving a screw head 85 and the second part 81b of the closing block is provided with screw threads 86 for cooperation with the screw-threaded portion 87 of the shank 88 of the screw.

In that case the counterbore 84 is not provided along the rim 83 of the bore with a collar but with spaced apart conical lugs 89, which during the screw-in movement self-lockingly cooperate with a mating shoulder defining a machined recess between the shank 88 and the head 85 of the screw, as in the former embodiment.

In accordance with FIG. 21 there is no counterbore for the screw head 85 but the conical lugs 89 are provided on the plane 91 at the rim 83 of the bore for the hinge screw. The constriction (recess-defining shoulder 90) under the screw head 85 is provided with oblique radial notches 92 and with corresponding elevations 93. In addition to the axial positive connection provided in all preceding embodiments, that design additionally provides a radial positive connection, which is particularly important for closing blocks, which require a certain initial stress, which in the course of time, e.g., as a result of an ageing of inserted plastic lenses, will decrease so that there is a self-loosening effect, which will be avoided by the double positive connection in axial and radial directions. By the releasable screw joint in accordance with the invention the screw will be captively held at the eyeglass hinge and at the closing block.

I claim:

1. An eyeglass frame provided with a screw and a screw joint which is locked against separation and connects frame members, which particularly consist of two hinge members, wherein a bore is provided at one end with female screw threads and at its other end with a flat abutment surface which extends radially outwardly from said bore and is provided with a wall to define a receptacle for receiving a screw head, characterized in that at least one of said hinge members and screw head are made from a deformable material, a conical elevation surrounding the bore is provided on the abutment surface for the screw head, an inner edge of a shank of the screw having a conical constriction under the screw head, whereby the shank is screwed in, the conical elevation surrounding said bore is deformed to extend into and is locked in the constriction.

2. An eyeglass frame according to claim 1, characterized in that the conical elevation in the receptacle for the screw head consists of an acute-angled annular means having an included angle between 35 and 45 degrees and extends around the rim of the bore.

3. An eyeglass frame according to claim 2, characterized in that the screw threads are formed in one of the hinge members and the receptacle for the screw head formed with an annular means is provided in the other hinge member.

4. An eyeglass frame according to claim 2, characterized in that the screw threads, on the one hand, and the receptacle for the screw head provided with an annular means, on the other hand, are provided in a split hinge member on opposite sides of a second hinge member.

5. An eyeglass frame according to claim 2, characterized in that the shank and head of the screw are made of special steel and the eyeglass hinge members are made of nickel silver.

6. An eyeglass frame according to claim 1, characterized in that the screw threads are formed in one of the hinge members and the receptacle receiving the screw head is formed with an annular extension in the other hinge member.

7. An eyeglass frame according to claim 1, characterized in that the screw threads, on the one hand, and the receptacle for the screw head provided with an annular means, on the other hand, are provided in a split hinge member on opposite sides of the other hinge member.

8. An eyeglass frame according to claim 7, characterized in that the shank and head of the screw are made of special steel and the eyeglass hinge members are made of nickel silver.

9. An eyeglass frame according to claim 1, characterized in that the shank and head of the screw are made of special steel and the hinge members are made of nickel silver.

10. An eyeglass frame according to claim 1, characterized in that the conical elevation on the abutment surface for receiving the screw head surrounds the bore and consists of a cylindrical portion provided with a conical crest.

11. An eyeglass frame according to claim 1, characterized in that the conical elevation provided on the abutment surface for receiving the screw head consists of spaced apart conical lugs around the bore.

12. An eyeglass frame according to claim 11, characterized in that the conical lugs of the abutment cooperate with oblique radial notches at the inner edge of the shank under the screw head and the lugs and notches differ in number.

13. An eyeglass frame according to claim 1, characterized in that the conical constriction at the inner edge of the shank of the screw under the screw head comprises oblique radial notches and corresponding elevations.

14. An eyeglass frame according to claim 13, characterized in that the conical lugs of the abutment for the screw head cooperate with oblique radial notches at the inner edge of the shank under the screw head and the lugs and notches differ in number, for instance, three conical lugs are combined with four oblique radial notches.

15. An eyeglass frame provided with a screw having a shank having a partial thread and a screw joint which is locked against separation and connects frame members, which particularly consist of two hinge members, wherein a bore is provided at one end with female screw threads and at its other end with a flat abutment surface forming a receptacle for receiving said screw head, a conical recess is provided on the outer periphery of the abutment surface for the screw head and the shank is provided at its outer edge, under the screw head, with a deformable conical rib, which will be deformed in abutting the hinge member and extend into the receptacle so as to effect a lock as the shank is screwed in.

16. An eyeglass frame according to claim 15, characterized in that the conical recess in the receptacle for the screw head consists of an acute-angled means having an included angle between 35 or 45 degrees and extends around a rim of the bore.

17. An eyeglass frame according to claim 15, characterized in that the screw threads are formed in one of the hinge members and the receptacle for the screw head formed with an annular means is provided in the other hinge member.

18. An eyeglass frame according to claim 15, characterized in that the screw threads, on the one hand, and the receptacle for the screw head provided with an annular means, on the other hand, are provided in a split hinge member on opposite sides of a second hinge member.

19. An eyeglass frame according to claim 15, characterized in that the shank and head of the screw are made of special steel and the eyeglass hinge members are made of nickel silver.

* * * * *